United States Patent [19]

Conner et al.

[11] Patent Number: 4,786,203
[45] Date of Patent: Nov. 22, 1988

[54] CONNECTOR ASSEMBLY FOR FOOD PREPARATION EQUIPMENT AND METHOD OF ASSEMBLY

[75] Inventors: John P. Conner, Grandville; James R. Bouse, Belmont, both of Mich.

[73] Assignee: Allied Tube & Conduit Corporation, Harvey, Ill.

[21] Appl. No.: 97,504

[22] Filed: Sep. 16, 1987

[51] Int. Cl.⁴ ............................................... F16B 7/08
[52] U.S. Cl. .................................... 403/190; 403/234; 403/237; 403/246; 403/342
[58] Field of Search ............... 403/190, 191, 192, 234, 403/237, 246, 342

[56] References Cited

U.S. PATENT DOCUMENTS

| | | | |
|---|---|---|---|
| 1,057,428 | 4/1913 | Dossert | 403/191 |
| 2,133,704 | 10/1938 | Jones | 306/30 |
| 2,647,000 | 7/1953 | Colley | 287/54 |
| 3,867,045 | 2/1975 | Beals | 403/190 |
| 3,891,334 | 6/1975 | Loikitz | 402/234 |
| 3,914,060 | 10/1975 | Miller et al. | 403/342 X |
| 4,150,907 | 4/1979 | Thurnauer | 403/234 |
| 4,264,230 | 4/1981 | Vanderminden | 403/180 |
| 4,386,870 | 6/1983 | Baroody | 403/234 |
| 4,444,125 | 4/1984 | Welsch et al. | 108/155 |
| 4,603,996 | 8/1986 | Chen | 403/7 |
| 4,655,630 | 4/1987 | Rinehart | 403/342 |

*Primary Examiner*—Andrew V. Kundrat
*Attorney, Agent, or Firm*—Fitch, Even, Tabin & Flannery

[57] ABSTRACT

A connector assembly for joining a horizontal member and a vertical member without the formation of substantial exposed gaps. The assembly includes a base with a saddle surface at one end and an abutment flange at the other end. The base has an aperture between the ends and a slot communicating with the aperture. A locking collar has a bore receiving the base and an inwardly directed annular lip at a first end of the collar. The collar also includes an internal screw thread and an abutment for engaging the flange of the base. Also the assembly includes a locking insert with a body for reception in the base. The insert has extending arms at one end terminating in screw threads and at the other end a holding flange for retaining the horizontal member. A method of using the connector assembly is also disclosed.

10 Claims, 3 Drawing Sheets

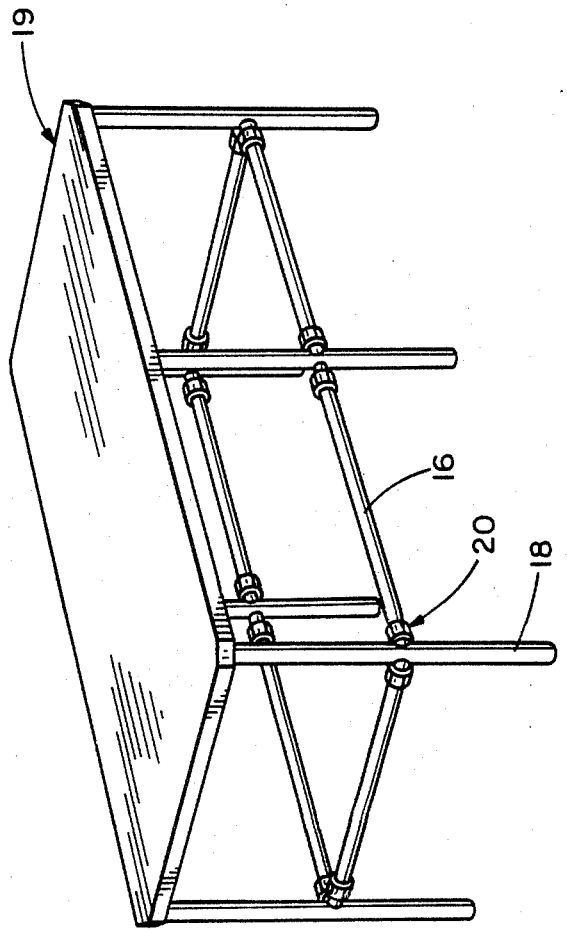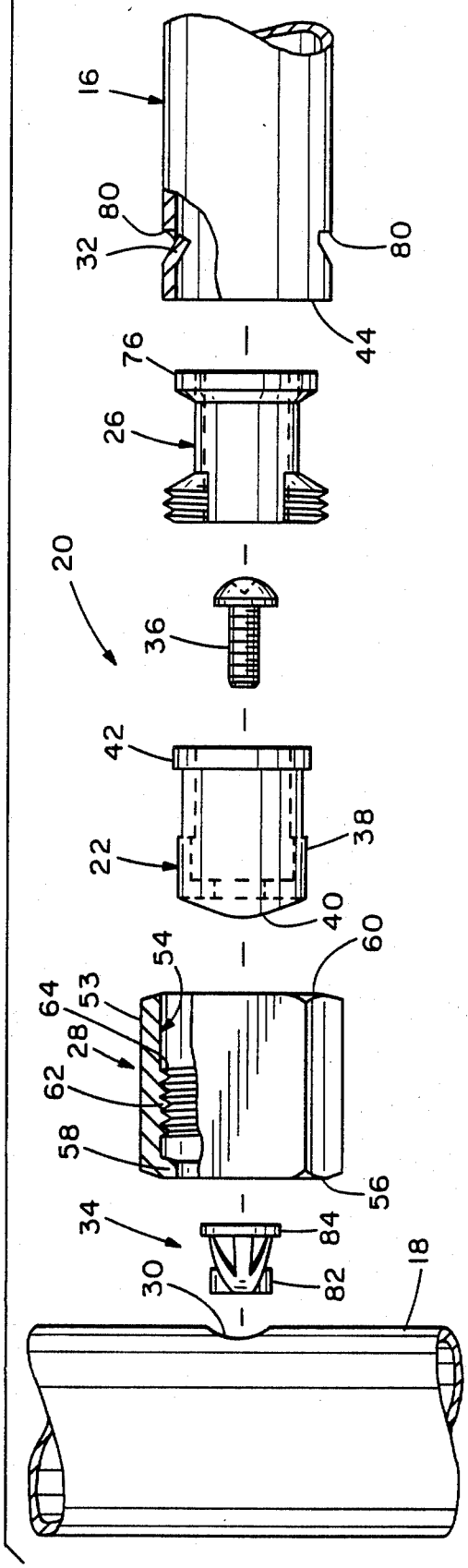

CONNECTOR ASSEMBLY FOR FOOD PREPARATION EQUIPMENT AND METHOD OF ASSEMBLY

This invention relates to connector assemblies and, more specifically, to a connector assembly for joining a vertical leg and a horizontal support in a food preparation table without the formation of substantial crevices or cracks.

BACKGROUND OF THE INVENTION

The National Sanitation Foundation (NSF), a body recognized by the food service supply industry, has promulgated various regulations with respect to the materials used in and the design of food service furniture such as food preparation tables. The construction materials currently approved by NSF for use in such furniture are stainless steel, zinc coated steel and polyamide 11 nylon over galvanized steel. NSF also requires that there be nothing in the furniture of a nature to cause a gap over 1/32". Food could collect in such a gap resulting in the growth of bacteria.

Various connector assemblies are known for joining a horizontal brace to a vertical leg in furniture or the like. However, these assemblies are not suitable for food service furniture because they result in the formation of cracks or crevices, or because certain components must be cemented together. For further information regarding the structure and operation of such connector assemblies, reference may be made to U.S. Pat. Nos. 4,386,870; 4,150,907 and 3,891,334. A knock-down work table for use in the food service industry is the subject of U.S. Pat. No. 4,444,125.

SUMMARY OF THE INVENTION

Among the several aspects and features of the subject invention is the provision of an improved connector assembly. The use of the connector assembly does not result in the formation of an substantial exposed gaps cracks or crevices, and the only preparation required for the vertical leg is drilling a hole and forming inwardly extending protuberances in the horizontal brace. The connector assembly also extends over areas of cut metal in the leg and brace to resist corrosion. The connector assembly of the present invention is easy to install, is reliable in use, has long service life, and is easy and economical to manufacture. Other aspects and features of the method of the present invention will be, in part, apparent and, in part, pointed out hereinafter in the following specification and in the accompanying drawings.

Briefly, the connector assembly of the present invention includes a base having at one end a saddle surface for engaging the outside surface of the vertical member and at the other an abutment flange. An aperture extends between the ends and a slot is provided communicating with the aperture. A locking collar defines a bore for receiving the base with a first end defining an opening having a diameter slightly greater than the diameter of the outside surface of the base. The collar has a second end with an inside diameter slightly greater than the outside diameter of the horizontal brace, and an internal screw thread is provided between the collar ends. The collar also has an abutment for engaging the abutment flange. The assembly also includes a locking insert having a body sized for reception in the base aperture with a leading end and a trailing end. The insert has an outward extension adjacent the leading end for reception in the slot in the base with a thread on the outside surface of the extension. A holding flange for bearing on the protuberances extends from the body adjacent the trailing end.

As a method, the present invention includes the following steps:

(a) the base is inserted through the collar with the saddle surface extending beyond the collar first end;
(b) the base is fastened to the vertical leg with the saddle surface engaging the outside surface of the leg;
(c) the insert is positioned in the horizontal member with the holding flange behind the protuberances and the leading end of the insert extending beyond the brace leading end;
(d) the insert body is positioned inside the base aperture with the extension projecting through the slot; and
(e) the collar is threaded onto the extension until the protuberances engage the holding flange and the abutment flange engages the brace end.

BRIEF DESCRIPTION OF THE DRAWINGS

FIG. 1 is a perspective view of a food preparation table including connector assemblies embodying various features of the present invention;

FIG. 2 is an exploded front elevational view of components of a connector assembly of FIG. 1;

Corresponding reference characters indicate corresponding components throughout the several views of the drawings.

DETAILED DESCRIPTION OF THE PREFERRED EMBODIMENT

Figure 3:
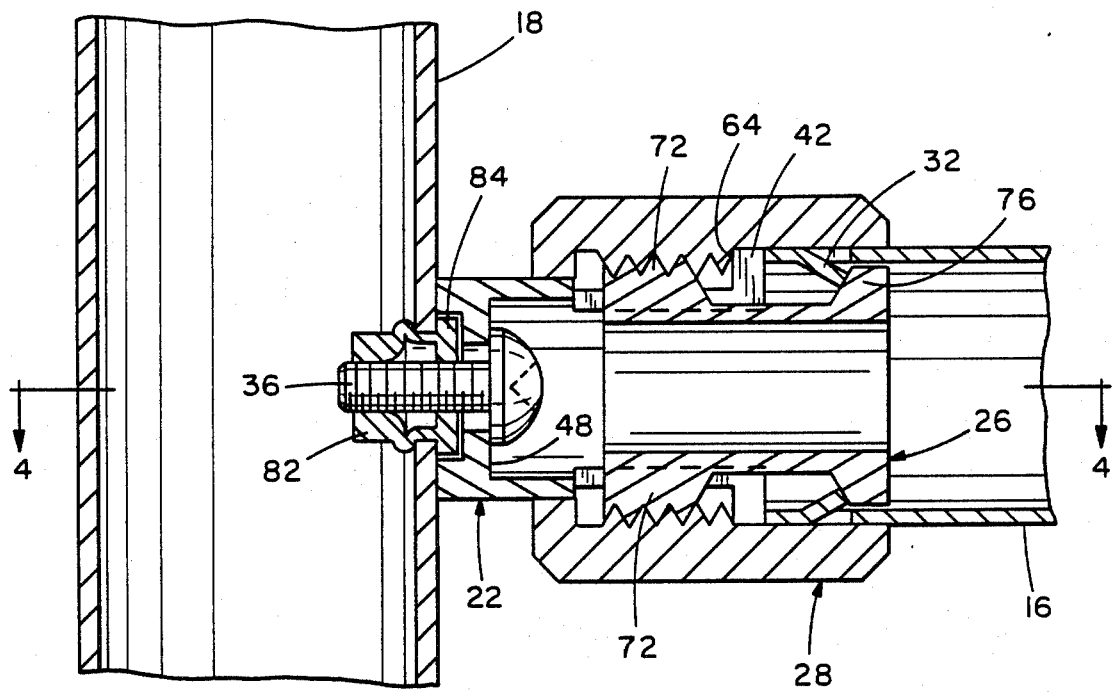
FIG. 3 is a sectional view of the assembled connector assembly holding a horizontal tubular member to a vertical tubular post.

Referring now to the drawings, a connector assembly of the present invention for joining a horizontal brace 16 to a vertical leg 18 in, for example, a food preparation table 19, is generally indicated in FIGS. 1—3 by reference numeral 20. The connector assembly 20 includes a generally cylindrical base 22 held to the vertical leg 18 by a fastener assembly, a locking insert 26 retained by the horizontal brace 16 and extending therefrom, and a locking collar 28 which is retained by the base and is threadably connected to the insert 26. The assembly 20 is particularly adapted for use with legs and braces formed of polyamide 11 nylon coated galvanized tubing which, as shown in the drawings, are preferably cylindrical. As will be explained in more detail below, to mount the assembly 20, a hole 30 must be drilled in the wall of the leg 18 and inwardly extending protuberances 32 must be formed in the horizontal brace which may result in separation of the metal. Besides avoiding the formation of substantial openings, the connector assembly 20 fully covers areas of cut metal in the leg and brace to resist corrosion.

The fastener assembly includes a deformable nut 34, and a bolt 36 preferable of zinc plated steel. The base 22, locking insert 26 and locking collar 28 are preferably formed of nylon or other high strength plastic material, as will be appreciated by those of skill in the art.

Figure 6:
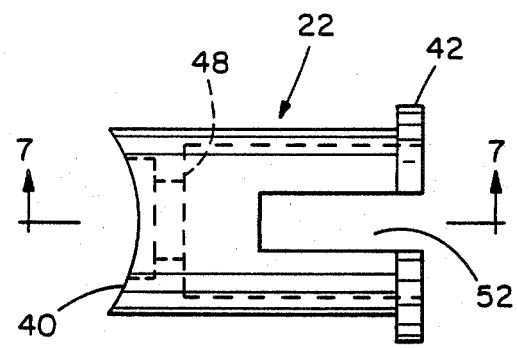
FIG. 6 is a plan view of the base of the connector assembly.
Figure 7:
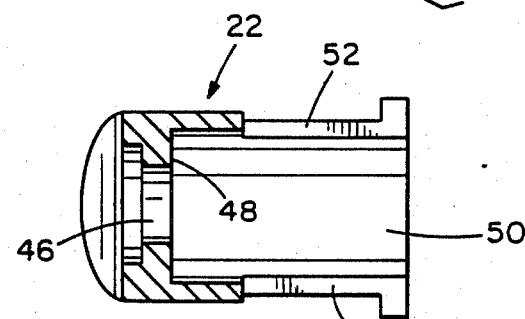
FIG. 7 is a cross sectional view taken generally along line 7—7 of FIG. 6.

More specifically, the base 22 has a generally cylindrical outside surface 38 and a saddle surface 40 at one end for engaging the outside surface of vertical leg 18. As best shown in FIG. 6, the saddle surface 40 defines a portion of a cylindrical surface having substantially the same diameter as the outside diameter of the leg 18 so that the body and leg may enter into substantially full surface engagement. An outwardly extending abutment flange 42 is provided at the other end of the base for engagement by both the collar 28 and the leading end 44 of the brace. The base has an aperture 46 extending between its ends and intersecting an interior ledge 48 (for engaging the head of the bolt 36). The aperture 46 has an enlarged portion 50 for receiving the insert 26, and a pair of diametrically opposed slots 52 extending from the other end of the base and communicating with aperture portion 50 to permit extension of components of the insert 26 radially outwardly of the base 22.

The locking collar 28, which may have a hexagonal outer surface 53 to permit tightening with a wrench, defines a bore 54 for receiving the base 22, and has a first end 56 with an inwardly directed annular lip 58 extending into the bore. The lip 58 defines an opening having a diameter substantially equal to but slightly greater than the diameter of the base outside surface 38. That is, with the base received by the collar, no gap between the two at the first end 56 of the collar is formed greater than 1/32 of an inch. The collar 28 has a second end 60 defining the cylindrical bore 54 which has a diameter substantially equal to but slightly greater than the outside diameter of the horizontal brace 22 so that when the collar second end 60 receives the horizontal brace 16, no gap greater than 1/32 of an inch is formed. An internal screw thread 62 is provide extending into the bore 54 between the lip 58 and the second end 60, with an annular abutment 64 adjacent the trailing end of the thread for engaging the base flange 42 to prevent complete passage of the base through the collar.

Figure 8:
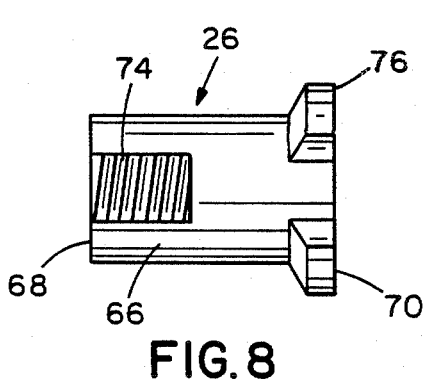
FIGS. 8-10 are a plan view, a first end elevation view and a second end elevational view of a locking insert of the assembly.
Figure 9:
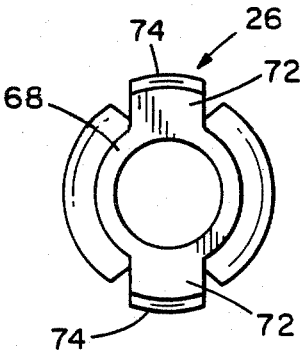
Figure 10:
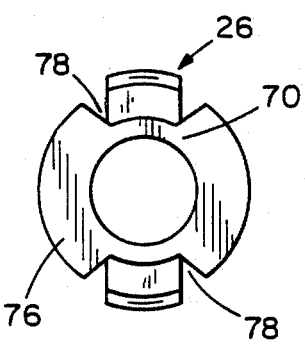

Referring to FIGS. 8-10, the locking insert 26 includes a body 66 sized for reception in the enlarged aperture portion 50 in the base 22. The insert has a leading end 68 and a trailing end 70 with a pair of diametrically opposed arms 72, terminating with screw threads 74 which are threadably engageable with the collar screw thread 62. The arms 72 extend through corresponding slots 52 when the insert body 66 is received in aperture portion 50. An annular holding flange 76 is provided extending radially outwardly from trailing end 70 for bearing on the protuberances 32 formed in the horizontal brace 16. The flange 76 is sized to fit inside the brace and is split, having open areas 78 to permit its insertion through the brace end 44 beyond the protuberances 32. By rotating the insert 26 with respect to the brace, components of the flange 76 are brought into alignment with the protuberances to preclude withdrawal of the insert from the brace.

The protuberances 32 can be formed in the brace by any convenient means, as will be apparent to one of skill in the art. One preferred method of formation involves placement of relatively short, transverse saw cuts 80 on diametrically opposed areas of the brace about ¼ inch from end 44. Striking the area between a cut 80 and the end 44 results in formation on a dimple or protuberance 32.

Operation of the connector assembly 20 of the present invention is as follows. After the hole 30 is drilled in the horizontal leg 18, the insert end 82 of the deformable nut 34 is placed through the hole, until the rim 84 of the deformable nut bears upon the outside surface of the vertical leg 18. The base 22 is inserted through the locking collar 28 until the saddle surface 40 extends beyond the lip 58. After inserting the threaded shaft of the bolt 36 through the aperture 46 in the base and into the insert end 82 of the nut 34, the bolt is tightened until the bolt head bears upon the internal ledge 48 in the base 22. Further tightening of the bolt 36 draws the deformable nut insert end 82 rearwardly causing it to expand to a size greater than the hole 30 thereby firmly affixing the base to the vertical leg.

Figure 4:
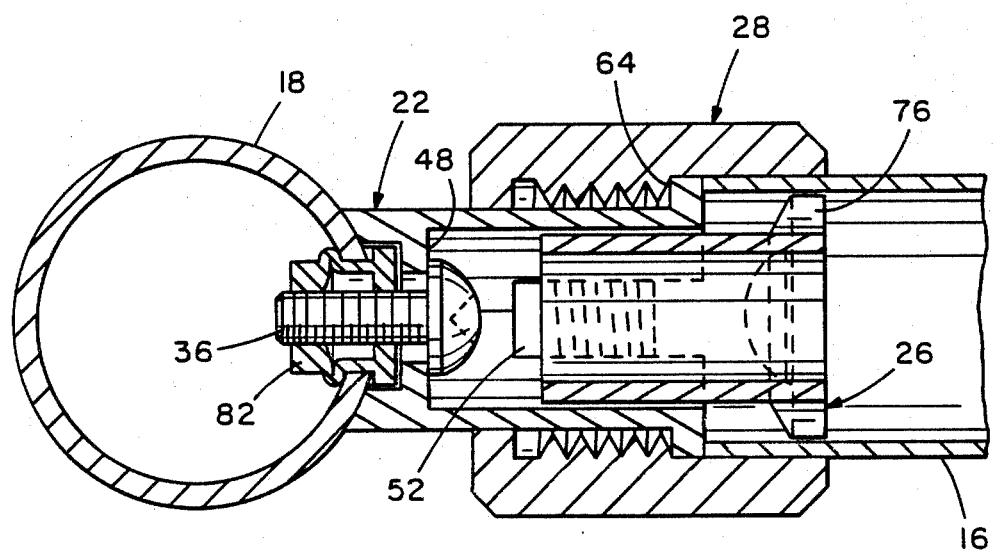
FIG. 4 is a sectional view taken generally along line 4—4 of FIG. 3.
Figure 5:
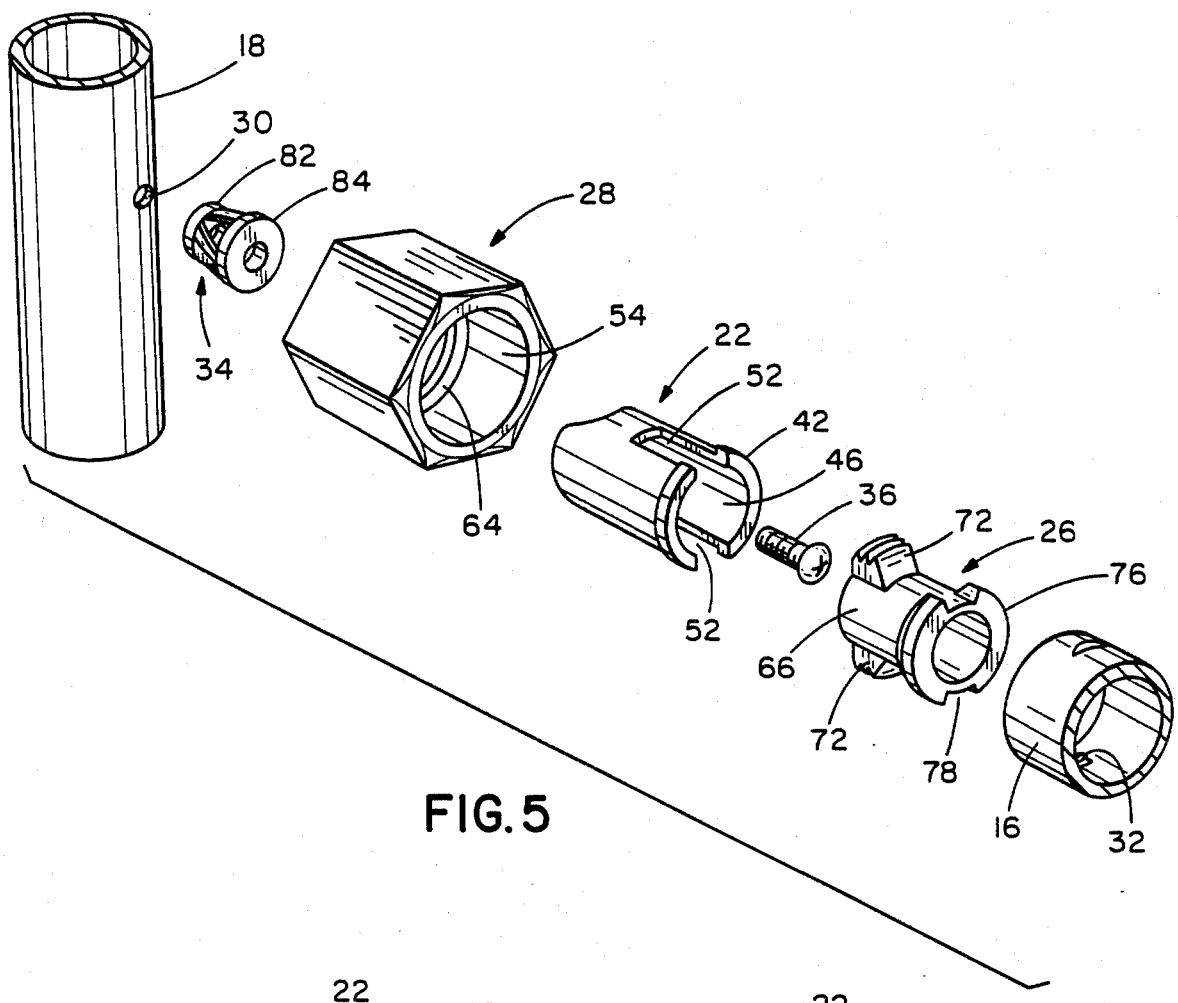
FIG. 5 is an exploded perspective view of certain components of the connector assembly of FIG. 1.

The locking insert 26 is aligned with the protuberances 32 of the horizontal brace 16 so that the insert 26 can be moved inside the brace without any interference from the protuberances. After the holding flange 76 is positioned behind the protuberances, the insert is rotated about 90 degrees so that the holding flange 76 is aligned with the protuberances. Preferably the arms 72 have a greater extension than the inside diameter of the brace so that the arms cannot be moved inside of the brace. Next the insert body 66 is moved inside of the enlarged portion 50 of aperture 46 with the arms 72 received in the base slots 52 and extending beyond the base outside surface 38. Upon advancing the collar 28 toward the insert and threading the screw thread 62 onto the arms 72, the insert is pulled towards the collar. This tightening continues until the leading end of the base abutment flange 42 is engaged by the abutment 64 in the collar and the brace end 44 engages the trailing end of the base abutment flange 42. The protuberances 32 are then in engagement with the holding flange 76 of the insert. Firm tightening of the collar 28 causes the end portion of the brace to be compressed slightly between the flanges 76 and 42, as shown in FIGS. 3 and 4.

Alternately collar 28, base 22, and insert 26 can be shipped partially assembled with threads of the arms 72 partially engaged with the threads 62 of collar 28.

It will be appreciated that the use of the connector assembly does not result in the formation of any gaps over 1/32 of an inch. Thus, the connector assembly of the present invention is particularly adapted for use in furniture used in the food service industry.

In view of the above, it will be seen that the several objects of the invention are achieved and other advantageous results attained.

As various changes could be made without departing from the scope of the invention, it is intended that all matter contained in the above description or shown in the accompanying drawings shall be interpreted as illustrative and not in a limiting sense.

What is claimed is:

1. A connector assembly for joining a substantially horizontal cylindrical tubular member having an interior protuberance adjacent its leading end to a substantially vertical tubular member without the formation of substantial exposed cracks or crevices in which food could collect, said connector assembly comprising:

a base with a generally cylindrical outside surface and having at one end a saddle surface for engaging the outside surface of said vertical member, having at its other end an abutment flange extending outwardly from the outside surface of said base, an aperture extending through said base between said ends, and slot means extending from said other end towards said one end;

fastener means for holding said base to said vertical member;

a locking collar defining a bore for receiving said base with a first end defining an opening having a diameter substantially equal to but slightly greater than the diameter of said base outside surface, a second end having an inside diameter substantially equal to but slightly greater than the outside diameter of said horizontal member, an internal screw thread disposed between said first end and said second end, and abutment means for engaging said abutment flange disposed between said thread and said second end; and a locking insert including a body sized for reception in the aperture of said base with a leading end and a trailing end, said insert having an outward extension means adjacent said insert leading end for reception by said base slot means with thread means on the outside surface of said extension means for threadably engaging the screw thread of said collar, and a holding flange for bearing on said protuberance extending outwardly from said body adjacent said trailing end and sized to fit inside said horizontal member whereby with said insert positioned in said horizontal member with said holding flange behind said protuberance and said insert leading end extending from said horizontal tube leading end, and with said base, holding said collar, fastened to said vertical member, threading said collar onto said insert extension means results in said collar abutment means engaging said base abutment flange with the leading end of said horizontal member bearing on said abutment flange of the base and the holding flange of the insert bearing on said protuberance.

2. A connector assembly as set forth in claim 1 wherein said fastener means comprises a deformable nut having an insert end for reception in said vertical member through a hole formed in the wall thereof and a rim for abutting the outside surface of the vertical member defining said hole, said fastener means further comprising a bolt for threading into said nut and having a head for applying force against said rim to deform said insert end causing it to expand to a size unable to pass through said hole.

3. A connector assembly set forth in claim 2 wherein said base has an internal ledge, intersected by said aperture, for engagement by said screw head.

4. A connector assembly as set forth in claim 1 wherein said vertical member is cylindrical and said saddle surface defines a portion of a cylindrical surface having substantially the same diameter as the outside diameter of said vertical member.

5. A connector assembly as set forth in claim 1 wherein said base slot means includes at least two spaced slots and wherein said insert outward extension means comprises at least two spaced arms for reception in said slots.

6. A connector assembly as set forth in claim 1 wherein said collar abutment means is disposed at the trailing end of said screw thread.

7. A connector assembly as set forth in claim 6 wherein said collar second end has a length greater than the length of said base abutment flange plus the length of horizontal member from its end to just behind said protuberance whereby, in the assembled condition of said connector, said second end extends beyond said protuberance.

8. A connector assembly as set forth in claim 1 wherein said horizontal member has a pair of spaced protuberances disposed substantially equidistant from the leading end of said horizontal member, said insert holding flange being split so that said holding flange can be inserted from said horizontal tubing leading end past said protuberances without interference therefrom, and rotation of said insert with respect to said horizontal member causes components of said holding flange to be brought into alignment with said protuberances so that said insert cannot be withdrawn from said horizontal member.

9. A connector assembly as set forth in claim 1 wherein said collar first end has an inwardly directed annular lip defining said opening.

10. A method of joining a substantially horizontal cylindrical tubular member having an interior protuberance adjacent its leading end to be connected to a substantially vertical tubular member using a connector assembly comprising:

a base with a generally cylindrical outside surface and having at one end a saddle surface and having at its other end an abutment flange extending outwardly from the outside surface of said base, an aperture extending through said base between said ends, and slot means extending from said other end towards said first end;

a locking collar defining a bore for receiving said base with a first end defining an opening having a diameter substantially equal to but slightly greater than the diameter of said base outside surface, a second end having an inside diameter substantially equal to but slightly greater than the outside diameter of said horizontal member, an internal screw thread disposed between said lip and said second end, and abutment means; and a locking insert including a body sized for reception in the aperture of said base with a leading end and a trailing end, said insert having an outward extension means adjacent said leading end for reception by said base slot means with thread means on the outside surface of said extension means, and a holding flange extending outwardly from said body adjacent said trailing end and sized to fit inside said horizontal member, said method comprising the following not necessarily sequential steps:

(a) inserting said base through said collar with said saddle surface extending beyond said collar first end, (b) fastening said base to said vertical member with said saddle surface engaging the outside surface of said vertical member;

(c) positioning said insert in said horizontal member with said holding flange behind said protuberance and the leading end of the insert extending beyond the horizontal member leading end;

(d) positioning said insert body inside said base aperture with said extension means projecting through said slot means; and (e) threading said collar onto said extension means until said protuberance engages said holding flange and said abutment flange engages said horizontal member leading end.

* * * * *